United States Patent
Boubeddi (10) Patent No.: US 10,905,276 B2
(45) Date of Patent: Feb. 2, 2021

(54) POWERLESS ESPRESSO MAKER

(71) Applicant: Safran Cabin Netherlands N.V., Alkmaar (NL)

(72) Inventor: Aziz Boubeddi, Amsterdam (NL)

(73) Assignee: Safran Cabin Netherlands N.V., Alkmaar (NL)

( * ) Notice: Subject to any disclaimer, the term of this patent is extended or adjusted under 35 U.S.C. 154(b) by 123 days.

(21) Appl. No.: 15/946,468

(22) Filed: Apr. 5, 2018

(65) Prior Publication Data
US 2019/0059632 A1 Feb. 28, 2019

Related U.S. Application Data
(60) Provisional application No. 62/552,480, filed on Aug. 31, 2017.

(51) Int. Cl.
*A47J 31/38* (2006.01)
*A47J 31/00* (2006.01)

(52) U.S. Cl.
CPC .............. *A47J 31/38* (2013.01); *A47J 31/005* (2013.01)

(58) Field of Classification Search
CPC ........... A47J 31/38; A47J 31/005; A47J 31/24
See application file for complete search history.

(56) References Cited

U.S. PATENT DOCUMENTS
4,421,014 A * 12/1983 Vicker .............. A47J 31/38
  99/289 P
7,377,207 B2 * 5/2008 Hug .............. A47J 31/402
  99/287

FOREIGN PATENT DOCUMENTS
| EP | 2742833 | 6/2014 |
| FR | 1449310 | 8/1966 |
| GB | 765801 | 1/1957 |
| GB | 1005838 A * 9/1965 ............. A47J 31/24 |
| KR | 20100010456 | 10/2010 |
| WO | 2009023712 A1 | 2/2009 |
| WO | 2016078741 | 5/2016 |

OTHER PUBLICATIONS
Coffeecrew.com: Gaggia Achille Lever: You are the machine: https://www.coffeecrew.com/gear-equipment-coffee/380-gaggia-achille-lever-you-are-the-machine.html (Year: 2006).*
Europe Patent Application No. 18166190.1, Communication pursuant to Article 94(3) EPC, dated Aug. 12, 2019.
Europe Patent Application No. 18166190.1, Extended European Search Report dated Oct. 18, 2018.

* cited by examiner

*Primary Examiner* — Ryan J. Walters
(74) *Attorney, Agent, or Firm* — Kilpatrick Townsend & Stockton LLP (57) ABSTRACT

Embodiments of the present disclosure relate generally to espresso makers that brew beverages without power. The machines are designed to work under manual power, delivering hot water to the brew portion of the machine from an integrated hot water source. The machines may be mounted on aircraft trolleys for seat-side coffee and/or espresso service.

12 Claims, 8 Drawing Sheets

POWERLESS ESPRESSO MAKER

CROSS REFERENCE TO RELATED APPLICATIONS

This application claims the benefit of U.S. Provisional Application Ser. No. 62/552,480, filed Aug. 31, 2017, titled "Manual Powerless Trolley Mounted Espresso Maker," the entire contents of which are hereby incorporated by reference.

FIELD OF THE DISCLOSURE

Embodiments of the present disclosure relate generally to espresso makers that brew beverages without power. The machines are designed to work under manual power, delivering hot water to the brew portion of the machine from an integrated hot water source. The machines may be mounted on aircraft trolleys for seat-side coffee and/or espresso service.

BACKGROUND

Espresso and coffee makers typically require electrical power to heat water and pressurize the system in order to brew a cup of espresso or coffee. Consequently, installation of these machines in aircraft is limited to galleys. When a passenger orders a cup of espresso in flight, the airline attendant is required to walk back to the galley, brew the espresso, and walk back to the passenger in order to deliver of beverage. Because espresso volume is so small (e.g., often one ounce), the beverage may cool before it is delivered. Brewing beverages this way is also time-consuming for the aircraft crew.

There have been attempts at installing batteries on a service trolley in order to power an espresso maker in the aircraft aisles. However, there are numerous challenges with these attempts. For example, batteries lead to additional weight required to be carried on board this aircraft. Additionally, certifying the use of a battery on board an aircraft with regulatory authorities is time-consuming and costly.

The present inventor has nonetheless sought ways to enhance the passenger experience of ordering an espresso or other coffee-related beverage in flight.

BRIEF SUMMARY

The present inventor has determined that it is desirable to mount an espresso maker on an aircraft trolley that can traverse the aircraft aisles during beverage service. This can allow beverage service to take place seat-side, such that a passenger may order an espresso, and the airline attendant can prepare the espresso on site. The espresso or other coffee beverage is brewed right next to the passenger, and is served warm and freshly brewed. One of the primary challenges in designing a trolley-mounted espresso maker has been addressing the hot water supply. Generally, power is required for heating the water and for providing heated water to the brewing reservoir. Manual press machines are available, but they are generally designed for home use, where the user pours an external source of hot water into the press cavity. When users are on ground, a hot water heater or hot water source is often easily accessible and nearby. However, in order for such a system to work in an aircraft aisle, it is not desirable to require an external source of hot water that must be poured into a press cavity. Such a process opens up the possibility for hot water spills and for cooling of the water as the beverage service continues in duration.

Embodiments of this disclosure thus provide systems and methods for brewing espresso or other coffee beverages using a manual and powerless espresso maker having an integrated hot water source. Instead of pouring boiling water next to a passenger, a hot water source is integrated into the espresso maker body. This allows the hot water source to be filled at one location, secured to the espresso maker body, and to supply water directly to the espresso maker brewing head. The integrated solution of combining the hot water source and espresso maker body into a single component eliminates hassles and dangers of requiring an external hot water source.

In one example, there is provided a powerless manual espresso maker device, comprising: an espresso maker body; a thermally insulated water source fluidly coupled with the espresso maker body, the espresso maker body comprising a lever-operated piston within an espresso maker body cavity and a water inlet, wherein raising the piston above the water inlet allows water to enter the body cavity. There may be included a water line that fluidly couples the espresso maker body and the thermally insulated water source. One end of the water line may cooperate with a check valve of the thermally insulated water source and another end of the water line cooperates with the water inlet of the espresso maker body. In one embodiment, water is delivered from the thermally insulated water source to the espresso maker body via gravity. In an alternate embodiment, water is delivered from the thermally insulated water source to the espresso maker body via vacuum suction.

The thermally insulated water source may have one or more check valves, venting valves, relief valves, or any combination thereof. The thermally insulated water source may have a lid comprising an opening configured to cooperate with a water line fluidly coupling the espresso maker body with the thermally insulated water source. In a specific embodiment, the espresso maker body further comprises a fluid conduit member configured to receive the thermally insulated water source. The thermally insulated water source may also have an internal water tube. The espresso maker body has a brew head, which supports grounds through which hot water is forced to make the hot beverage. The espresso maker body may also have a water source receiving base.

DETAILED DESCRIPTION

Figure 1:
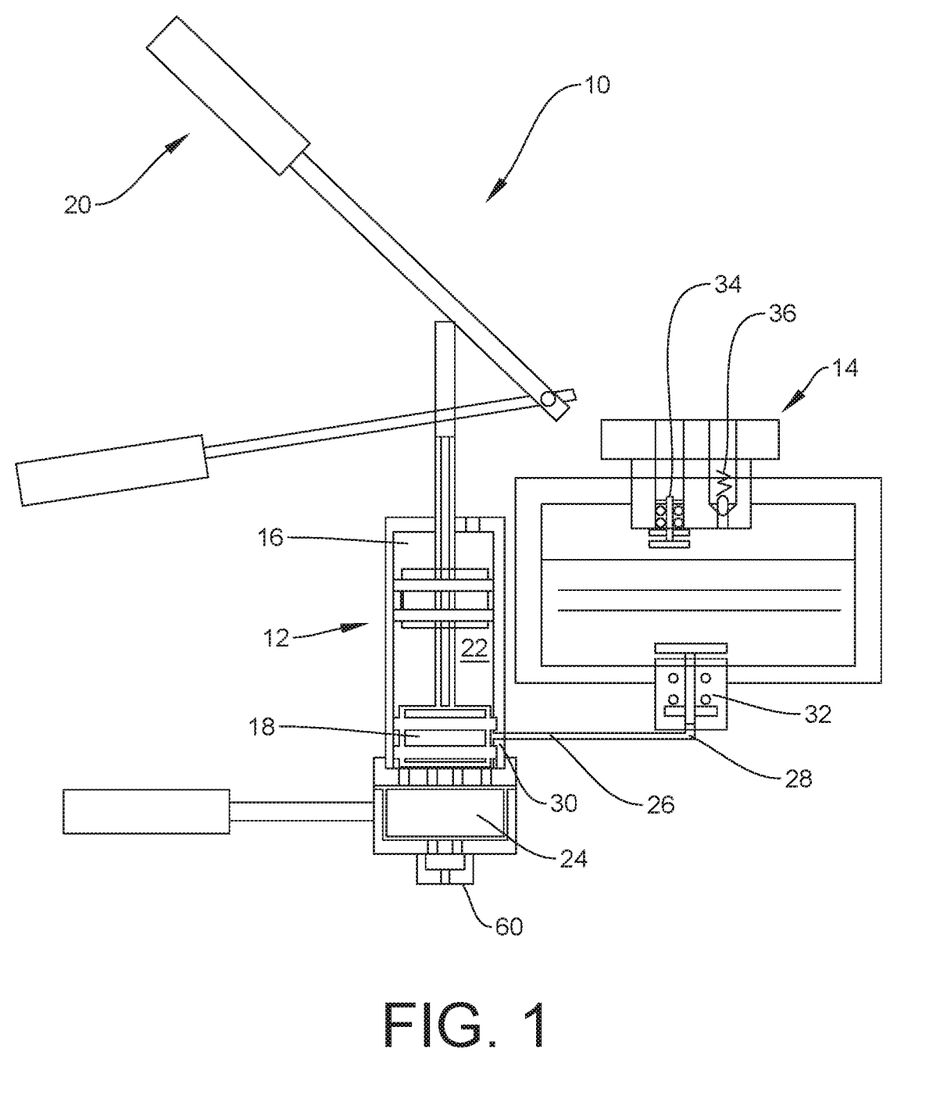
FIG. 1 shows a side plan schematic view of one embodiment of a powerless espresso maker described herein.
Figure 2:
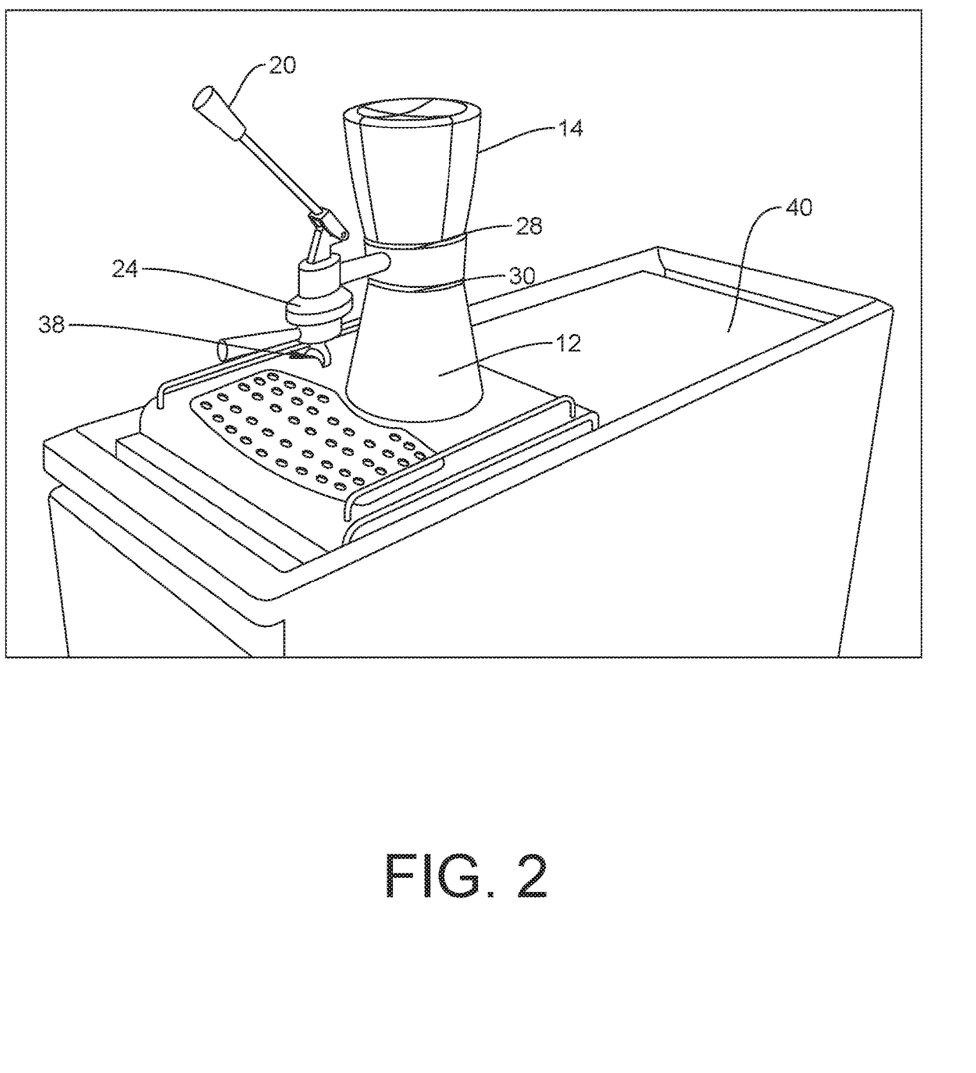
FIG. 2 shows a side perspective view of one example of a gravity-fed espresso maker having an integrated water source.
Figure 3:
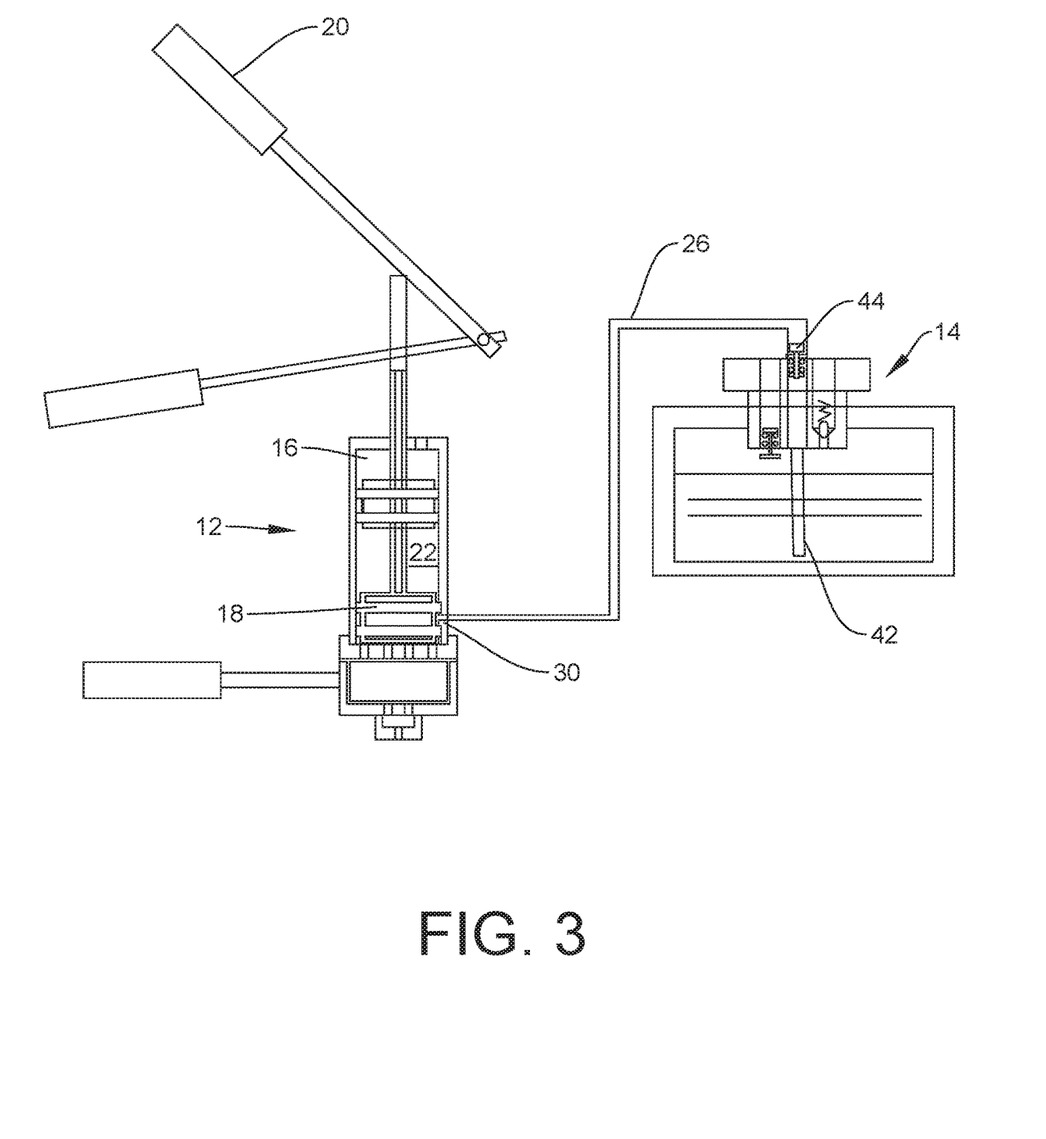
FIG. 3 shows a side plan schematic view of an alternate embodiment of a powerless espresso maker described herein.

Embodiments of the present invention provide various examples of a manual and powerless espresso maker. The espresso maker may be mounted on an aircraft trolley in order to provide beverage service in aircraft aisles. Two primary embodiments are disclosed. One embodiment functions via gravity (FIGS. 1 and 2). One embodiment functions via vacuum/suction (FIGS. 3-8). In the embodiment illustrated by FIG. 1, the espresso maker system 10 has an espresso maker body 12 and a thermally insulated water source 14. The thermally insulated water source 14 is generally positioned in order to deliver gravity-supplied hot water to the espresso maker body 12.

The espresso maker body 12 is defined by a cylinder 16 that houses a piston 18. The piston 18 is cooperable with a lever 20. Raising and lowering of the lever 20 causes corresponding raising and lowering of the piston 18. The cylinder 16 defines an open space or cavity 22 into which hot water is delivered for brewing. The cylinder 16 also supports a brew head 24 which functions as grounds support. The brew head 24 may receive a coffee filter filled with espresso powder, a prepackaged pod, or any other appropriate brewing grounds. The brewed beverage leaves the brew head at a beverage outlet 60.

FIG. 1 also illustrates the thermally insulated water source 14. The thermally insulated water source 14 is fluidly associated with the espresso maker body 12. In one example, the fluid association is via a water outlet 28. In one particular example, the fluid association is via a water line 26 that exits the water outlet 28. Although shown schematically as an external water line 26, it is generally envisioned that water line 26 may be designed to be an internal line. In other examples, such as the one illustrated by FIG. 2, the thermally insulated water source 14 is positioned such that a water exit location 28 on the source 14 is positioned higher than (or otherwise above) a water entry location 30 on the espresso maker body 12. As such, the thermally insulated water source 14 is positioned such that water leaving the source 14 is delivered to the espresso maker body 12 via gravity. The source 14 is positioned at least slightly or completely above the body 12. This allows an integrated water source to deliver water directly to the espresso maker body cylinder 16 which routes the hot water through the brew head 24 via pressure on the lever 20 which translates to pressure on the piston 18. This pressure forces the hot water through the brew head 24 and the corresponding brewing grounds.

Referring back to FIG. 1, the thermally insulated water source 14 is shown as provided with one or more check valves. One of the check valves 32 is provided at or near the water outlet 28. This check valve 32 allows removal and replacement of the water source 14 without causing leaks. The check valve 32 provides a disconnect feature, such that when a user removes the water source, the check valve 32 closes the water outlet 28, preventing water from leaving the water outlet. When the water source 14 is to be re-positioned back into place with respect to the espresso body 12, the check valve 32 opens to allow the water source 14 to re-communicate fluidly with the espresso body 12 without a water leak during the re-positioning.

The thermally insulated water source 14 may also be provided with one or more venting valves 34. The venting valve 34 is provided in order to allow air to enter the thermally insulated water source 14 and equalize pressure, preventing creation of a vacuum in the water source 14.

The thermally insulated water source 14 may also be provided with one or more pressure relief valves 36. The pressure relief valve 36 is provided in order to release steam that may accumulate within the water source 14 from the boiling hot water. This can also help equalize pressure, preventing creation of a pressure build-up in the water source 14.

FIG. 2 shows one embodiment of the gravity version system in practice. This system is mounted on an upper surface of a trolley 40. In this example, the thermally insulated water source 14 is positioned above and otherwise on top of the espresso maker body 12. In use, the thermally insulated water source 14 can be unscrewed or otherwise removed from the body 12 and filled with hot/boiling water. The lid of the source may be at a lower or supper portion. The lid may be at a lower portion, such that once filled, the water source 14 is flipped so that the lid cooperates with an upper portion of the espresso maker body 12. In another example, the lid may be located at the upper end of the water source 14 when positioned with respect to the espresso maker body 12. In either option, the water source 14 is secured in place with respect to the espresso maker body 12 and fluid communication is created. In the example illustrated, the brew head 24 extends from the body 12 and forms a spigot system 38. Activation of the lever 20 pulls water from the water source 14 into the espresso maker body 12. Water is forced into the espresso maker body via gravity. The brewed beverage leaves the system at the spigot system 38.

Figure 4:
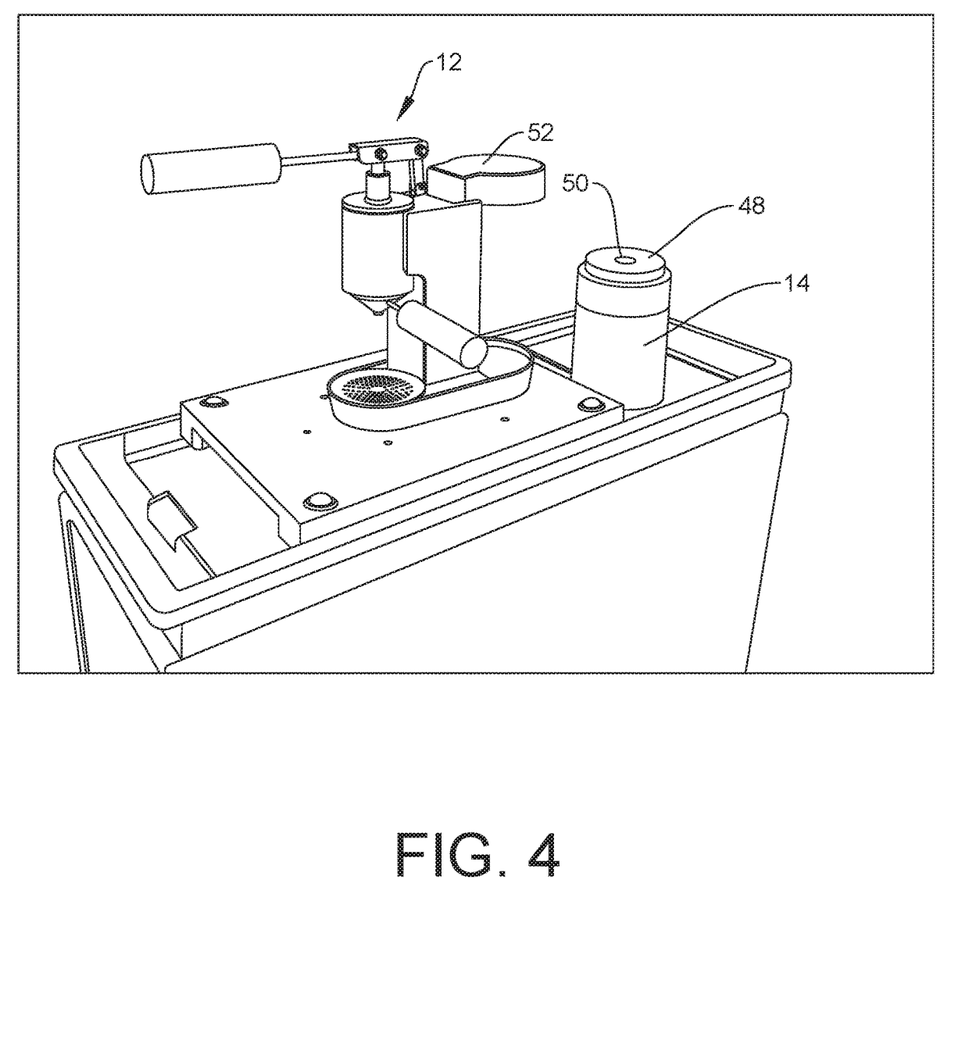
FIG. 4 shows a side perspective view of one example of an espresso maker having an integrated and removable canister that functions as the thermally insulated water source.
Figure 5:
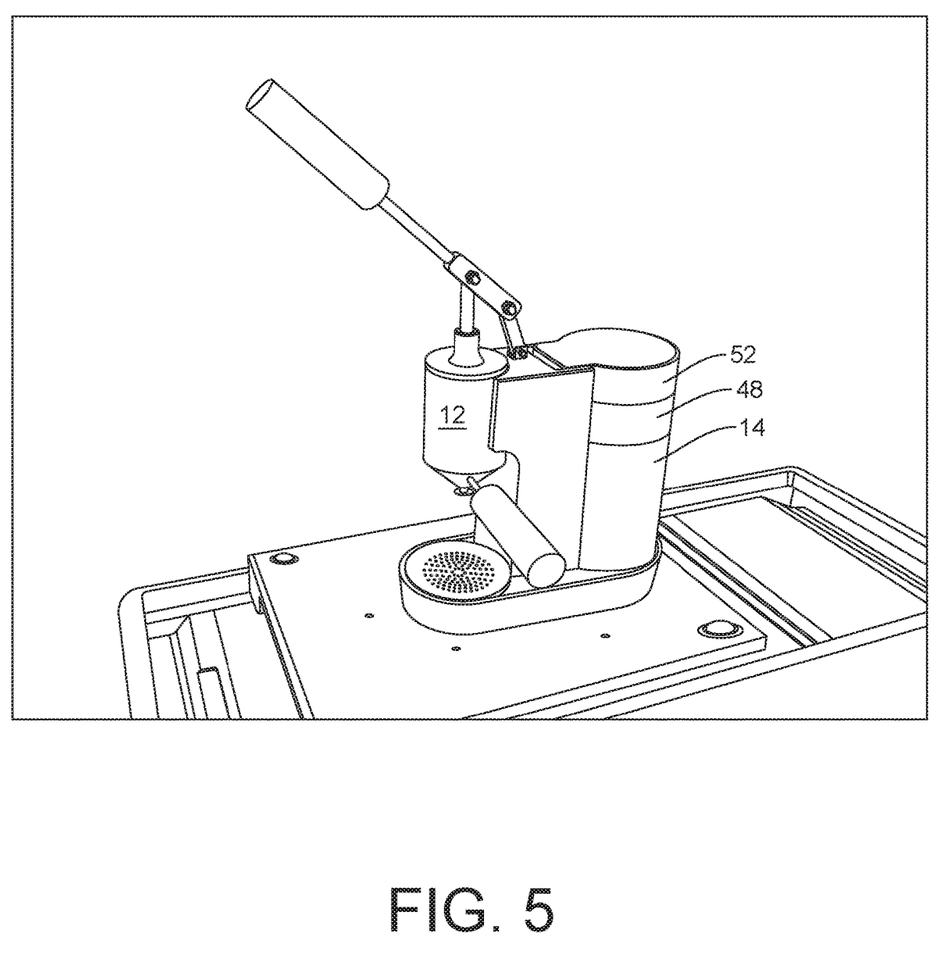
FIG. 5 shows a side perspective view of the espresso maker of FIG. 4, with the water source secured in place and the lever raised.
Figure 6:
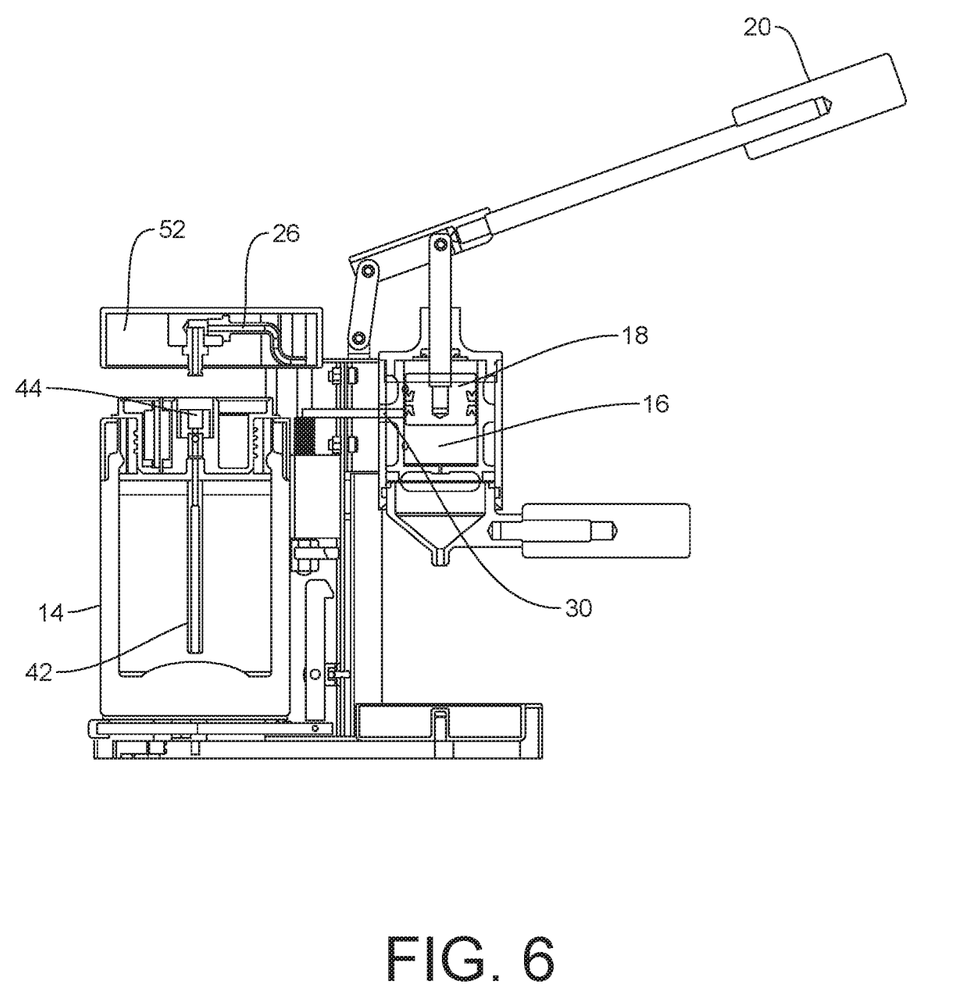
FIG. 6 shows a side plan view of the espresso maker of FIG. 5.

In an alternate embodiment, hot water is pulled into the espresso maker body 12 via suction or a vacuum that is created. One benefit of this alternate embodiment is that the thermally insulated water source 14 may be located anywhere desirable. There is no need for the water source 14 to be positioned above the water inlet 30 in order to allow gravity force delivery of the water. As illustrated by FIGS. 3-8 and referring more specifically to the schematic of FIG. 3, the espresso maker body 12 is a cylinder 16 (or other shaped container that defines an internal cavity 22), a piston 18, and a lever 20. A water line 26 also fluidly connects the espresso body 12 with the thermally insulated water source 14. However, in this embodiment, rather than water leaving the water source 14 via gravity at a water exit that is positioned along a base or lower portion of the water source 14, the water source 14 has a water tube 42 that cooperates with a check valve 44 and the water line 26. When the lever 20 is activated (i.e., raised), it raises the piston 18 and creates a vacuum inside the cylinder. For example, when the piston 18 is raised above the water inlet 30, a vacuum or suction force is created in the cylinder 16 and exerted on the water line 26. When this occurs, the check valve 44 opens from the force of the vacuum and water is sucked from the water source 14 into water tube 42 and delivered through the water line 26 to the cylinder 16. This occurs regardless of the location of the water source 14 with respect to the espresso maker body 12. As illustrated by FIGS. 4-6, the thermally insulated water source 14 may be secured side-by-side with respect to the espresso maker body 12. FIG. 4 illustrates the thermally insulated water source 14 with a lid 48. The lid 48 may be removed in order to fill the water source 14 with boiling or hot water. Replacement of the lid 48 maintains the water in its heated state, due to thermal properties of the thermally insulated water source 14. Lid 48 has an opening 50 that is configured to cooperate with fluid conduit member 52 of the espresso maker body 12. As shown FIGS. 6 and 8, in one embodiment, the fluid conduit member 52 extends from the espresso mater body 12. It houses a water line 26 that can deliver water to the cylinder 16. FIG. 5 illustrates the thermally insulated water source 14 mounted with respect to the espresso maker body 12 and in fluid communication therewith via the fluid conduit member 52.

Figure 7:
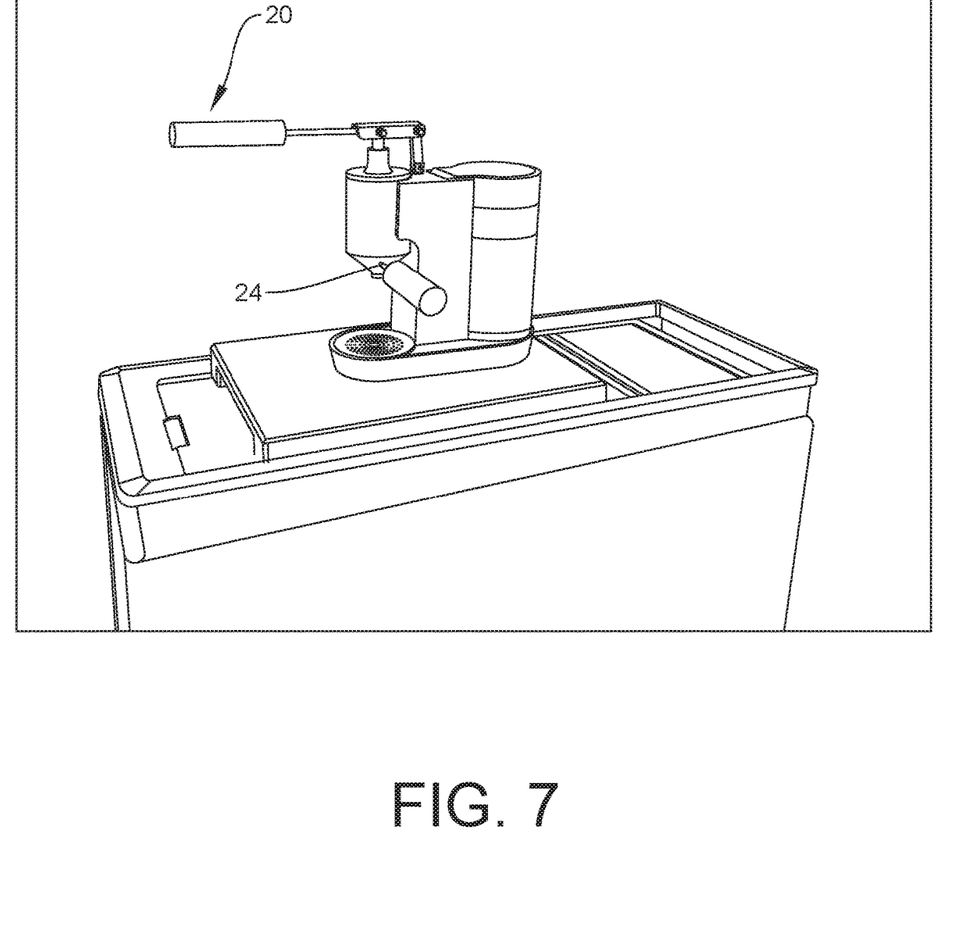
FIG. 7 shows a side perspective view of the espresso maker of FIG. 5, with the lever lowered.
Figure 8:
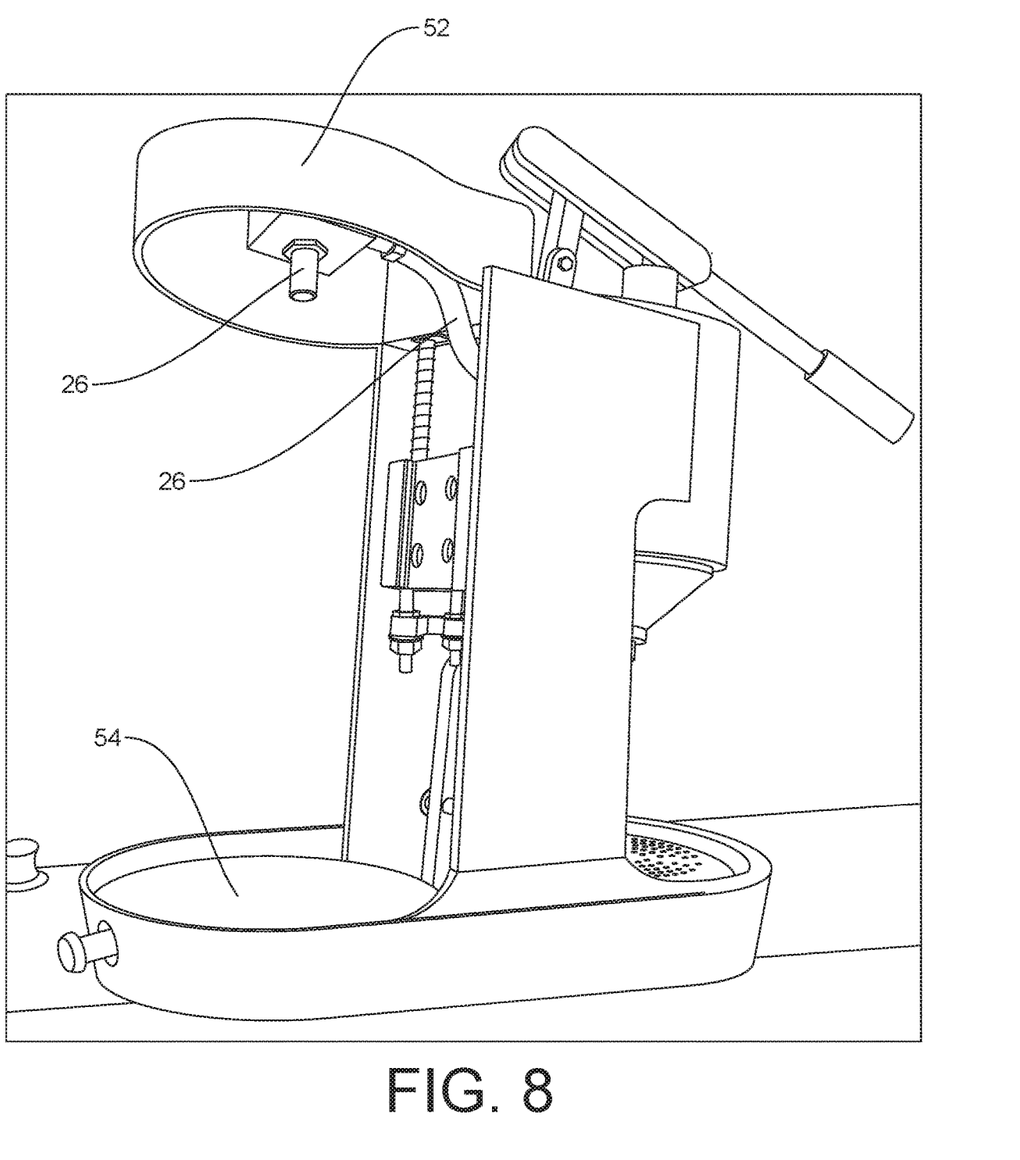
FIG. 8 shows an alternate side perspective view of the espresso maker of FIG. 4.

FIG. 6 illustrates a side cross-sectional view of the embodiment of FIG. 5. This image illustrates the water tube 42 positioned within the thermally insulated water source 14 and its cooperation with check valve 44. When the thermally insulated water source 14 is secured to the fluid conduit member 52, the water line 26 cooperates with the check valve 44, creating fluid communication therebetween. Raising of the lever 20 creates a vacuum in the cylinder 16. When the piston 18 is the above the water inlet 30, water is pulled from the thermally insulated water source 14, into the water line 26, and delivered to the cylinder 16. When the lever 20 is lowered as illustrated by FIG. 7, the hot water is forced through the brew head 24, creating a brewed beverage. In the example shown, the brew had 24 may be a removable grounds holder. FIG. 8 shows a side perspective view of the espresso maker body 12 before the water source 14 has been positioned, illustrating the presence of water line 26. This image also shows the water source receiving base 54.

As described, no power is required in order to move the hot water from the water source 14 to the espresso maker body 12. The system 10 works manually via creation of a vacuum, delivering a seat-side brewed beverage.

While this disclosure provides specific embodiments designed to meet the described goals and purposes, it should be understood that changes and modifications, additions and deletions may be made to the structures and methods recited above and shown in the drawings without departing from the scope or spirit of the disclosure or the following claims.

What is claimed is:

1. A manual espresso maker device, comprising:
   an espresso maker body comprising a water inlet;
   a thermally insulated water source configured to be fluidly coupled with the espresso maker body,
   a water tube extending into the thermally insulated water source;
   a water line that receives water from the water tube and delivers water to the water inlet of the espresso maker body;
   a lid of the thermally insulated water source, the lid comprising an opening that cooperates with the water line;
   the espresso maker body comprising a lever-operated piston within an espresso maker body cavity;
   wherein activating the lever-operated piston creates a suction force that pulls water into the water tube of the thermally insulated water source,
   wherein lowering the lever-operated piston delivers water to the water line and into the water inlet of the espresso maker body.

2. The device of claim 1, wherein the thermally insulated water source and the espresso maker body are mounted in side-by-side configuration.

3. The device of claim 1, wherein the thermally insulated water source is configured to be filled with hot water, the lid secured, then mounted with respect to the espresso maker body.

4. The device of claim 1, wherein the water line fluidly couples the espresso maker body and the thermally insulated water source.

5. The device of claim 1, wherein the water line fluidly couples the thermally insulated water source with the espresso maker body, wherein one end of the water line cooperates with a check valve of the thermally insulated water source and another end of the water line cooperates with the water inlet of the espresso maker body.

6. The device of claim 1, wherein water is delivered from the thermally insulated water source to the espresso maker body via vacuum suction.

7. The device of claim 1, wherein the thermally insulated water source comprises one or more check valves, venting valves, relief valves, or any combination thereof.

8. The device of claim 1, wherein the espresso maker body further comprises a fluid conduit member configured to receive the thermally insulated water source.

9. The device of claim 1, wherein in the thermally insulated water source comprises an internal water tube.

10. The device of claim 1, wherein the espresso maker body further comprises a brew head.

11. The device of claim 1, wherein the espresso maker body further comprises a water source receiving base.

12. The device of claim 1, wherein brewing water comes directly from hot water poured into the thermally insulated water source and not from an internal heating component.

\* \* \* \* \*